United States Patent
Hoeben

(10) Patent No.: US 7,321,762 B2
(45) Date of Patent: Jan. 22, 2008

(54) MECHANISM FOR RESERVING MULTIPLE CHANNELS OF A SINGLE MEDIUM ACCESS CONTROL AND PHYSICAL LAYER

(75) Inventor: Maarten Hoeben, Amersfoort (NL)

(73) Assignee: Conexant Systems, Inc., Newport Beach, CA (US)

(*) Notice: Subject to any disclaimer, the term of this patent is extended or adjusted under 35 U.S.C. 154(b) by 187 days.

(21) Appl. No.: 10/766,409

(22) Filed: Jan. 27, 2004

(65) Prior Publication Data
US 2004/0242252 A1    Dec. 2, 2004

Related U.S. Application Data

(60) Provisional application No. 60/457,675, filed on Mar. 26, 2003.

(51) Int. Cl.
*H04M 1/725*    (2006.01)

(52) U.S. Cl. ............... 455/412.2; 370/95.1; 455/426.1; 455/426.2; 455/452.2; 455/452.1; 455/510; 455/515

(58) Field of Classification Search ............ 455/426.1, 455/426.2, 452.1, 452.2, 509, 51, 412.2, 455/450; 370/95.1, 474
See application file for complete search history.

(56) References Cited

U.S. PATENT DOCUMENTS

| | | | |
|---|---|---|---|
| 5,231,634 A * | 7/1993 | Giles et al. ................. | 370/348 |
| 6,349,210 B1 * | 2/2002 | Li .............................. | 455/450 |
| 6,389,039 B1 * | 5/2002 | Katinakis et al. .......... | 370/474 |

2002/0071448 A1    6/2002  Cervello et al.

FOREIGN PATENT DOCUMENTS

WO    WO 02/082751 A2    10/2002

OTHER PUBLICATIONS

Jain et al., "A multichannel CSMA MAC protocol with receiver-based channel selection for multihop wireless networks", Conference Proceedings Article, Oct. 15, 2001, pp. 432-439.
IEEE, "802.11g IEEE Local and metropolitan networks; Part 11: Wireless LAN Medium Access Control (MAC) and Physical Layer (PHY) specifications; Amendment 4: Further Higher data Rate Extension in the 2.4 GHz Band", IEEE STD 802.11G-2003, Jun. 27, 2003, p. I-X, 1-67, XP002298432, no date listed.
Zyren, "IEEE 802.11g Explained", Whitepaper, Online, Dec. 6, 2001, p. 1-8, XP002298433, http://www.techonline.com/community/related_content/21769>, retrieved on Sep. 28, 2004.
Halford et al., "NonERP Indication Element: Issues from Draft 5.0", IEEE 802.11-03-101R0, Online, Jan. 2003, p. 1-10, XP002298434, http://grouper.ieee.org/groups/802/11.

* cited by examiner

*Primary Examiner*—Lester G. Kincaid
*Assistant Examiner*—Charles Shedrick
(74) *Attorney, Agent, or Firm*—Thomas, Kayden, Horstemeyer & Risley LLP

(57) ABSTRACT

A method and apparatus are disclosed for enabling coexistence in a wireless local-area network between legacy stations and stations that can transmit higher-bandwidth signals. The illustrative embodiment employs a transceiver that can transmit and receive higher-bandwidth signals over a combination of two or more shared-communications channels, and an enhanced medium access control (MAC) protocol by which stations progressively reserve channels before transmitting higher-bandwidth signals.

22 Claims, 8 Drawing Sheets

MECHANISM FOR RESERVING MULTIPLE CHANNELS OF A SINGLE MEDIUM ACCESS CONTROL AND PHYSICAL LAYER

CROSS-REFERENCE TO RELATED APPLICATIONS

This application claims the benefit of U.S. provisional application Ser. No. 60/457,675, filed Mar. 26, 2003, entitled "Mechanism for Reserving Multiple Channels of a Single Medium Access Control and Physical Layer," which is herein incorporated by reference.

FIELD OF THE INVENTION

The present invention relates to telecommunications in general, and, more particularly, to wireless local area networks.

BACKGROUND OF THE INVENTION

FIG. 1 depicts a schematic diagram of an exemplary wireless local-area network (LAN) 100 in the prior art comprising access point 101, stations 102-1 through 102-M, wherein M is a positive integer, and shared communications channel 103, interconnected as shown. Each station 102-i, wherein i is a member of the set {1, 2, . . . M}, is a device such as a notebook computer, personal digital assistant (PDA), tablet PC, etc. that transmits radio signals to and receives radio signals from other stations in local-area network 100 via access point 101.

Access point 101 and stations 102-1 through 102-M transmit data blocks called frames over shared-communications channel 103 such that if two or more stations (or an access point and a station) transmit frames simultaneously, then one or more frames can become corrupted (resulting in a collision). Local-area networks therefore typically employ a Medium Access Control (MAC) protocol for ensuring that a station can gain exclusive access to shared-communications channel 103 for an interval of time in order to transmit one or more frames.

In wireless local-area networks based on the Institute of Electrical and Electronics Engineers (IEEE) 802.11 standard, the MAC protocol is based on a Carrier Sense Multiple Access (CSMA) mechanism in which a station or access point can detect whether shared-communications channel 103 is busy or idle. If shared-communications channel 103 is busy, a station or access point will wait until the channel is idle before attempting to transmit a signal.

A common technique for achieving increased data rates in telecommunications networks is to use more spectrum for transmitting and receiving signals. Accordingly, stations and access points could communicate with higher data rates in wireless local-area networks by transmitting and receiving higher-bandwidth (i.e., "wide") signals over a combination of two or more shared-communications channels. Such stations and access points are referred to subsequently in this specification as enhanced stations and enhanced access points, respectively.

A major obstacle in deploying enhanced stations and access points, however, is the huge installed base of legacy stations. In particular, the new, wider waveforms of enhanced stations might not be recognized by legacy stations. Consequently, a legacy station might incorrectly identify a shared-communications channel as idle and transmit a signal over the channel, resulting in a collision. There is therefore a need for enhanced stations and access points that can coexist with legacy stations in local-area networks without any deleterious effects on the operation of the legacy stations, or on the operation of the enhanced stations. (Since a legacy access point cannot handle the wider signals of an enhanced station, coexistence between an enhanced station and a legacy access point would require the enhanced station to operate in a "legacy mode.")

SUMMARY OF THE INVENTION

The present invention is an enhanced wireless station that can transmit higher-bandwidth signals and can coexist with legacy stations in a local-area network. In particular, the illustrative embodiment employs
 (i) a transceiver that can transmit and receive
  (a) wide signals over a combination of two or more shared-communications channels, and
  (b) legacy-bandwidth signals over any single shared-communications channels; and
 (ii) an enhanced medium access control (MAC) protocol.

The transceiver and enhanced MAC protocol of the enhanced station are also used in an enhanced access point that supports both enhanced stations and legacy stations.

The enhanced MAC protocol avoids collisions between an enhanced station and
 (i) another enhanced station,
 (ii) an enhanced access point, and
 (iii) a legacy station in each of the shared-communications channels. Since the medium access control of legacy stations is left unchanged, collisions between two or more legacy stations are avoided as in the prior art.

The illustrative embodiment is disclosed in the context of Institute of Electrical and Electronics Engineers (IEEE) 802.11 wireless networks; however, it will be clear to those skilled in the art how to make and use embodiments of the present invention for networks based on other standards and protocols.

The illustrative embodiment comprises: a receiver for receiving a first message over a first shared-communications channel, wherein the first message comprises: (i) a notification that the first shared-communications channel has been reserved, (ii) a first time interval associated with subsequent reserving of a second shared-communications channel, and (iii) a second time interval associated with transmitting a first signal over the combination of the first shared-communications channel and the second shared-communications channel, wherein the second time interval is after the first time interval; and a transmitter for transmitting, within the first time interval, a second signal over the first shared-communications channel only.

DETAILED DESCRIPTION

Figure 1:
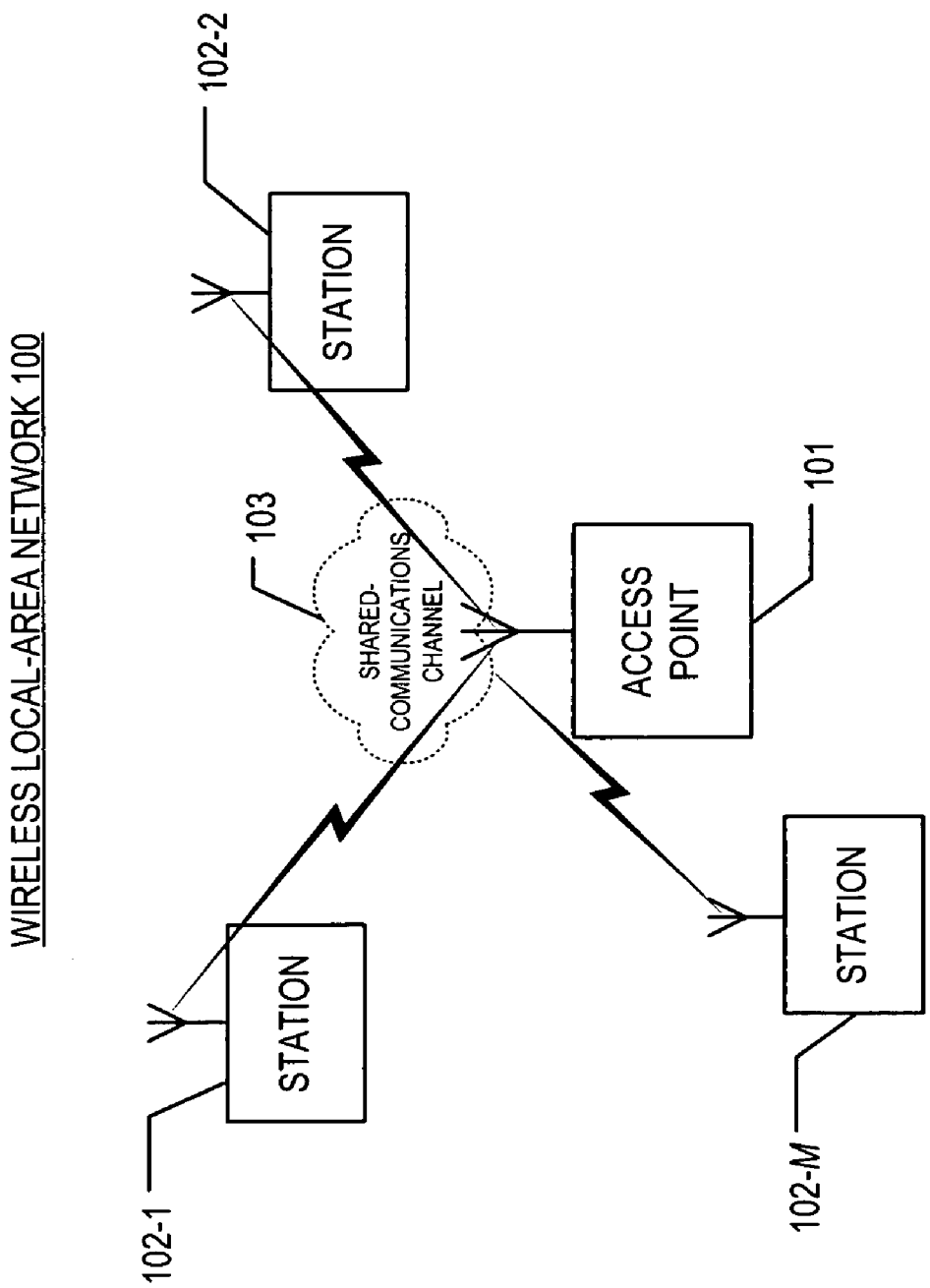
FIG. 1 depicts a schematic diagram of an exemplary wireless local-area network 100 in the prior art.
Figure 2:
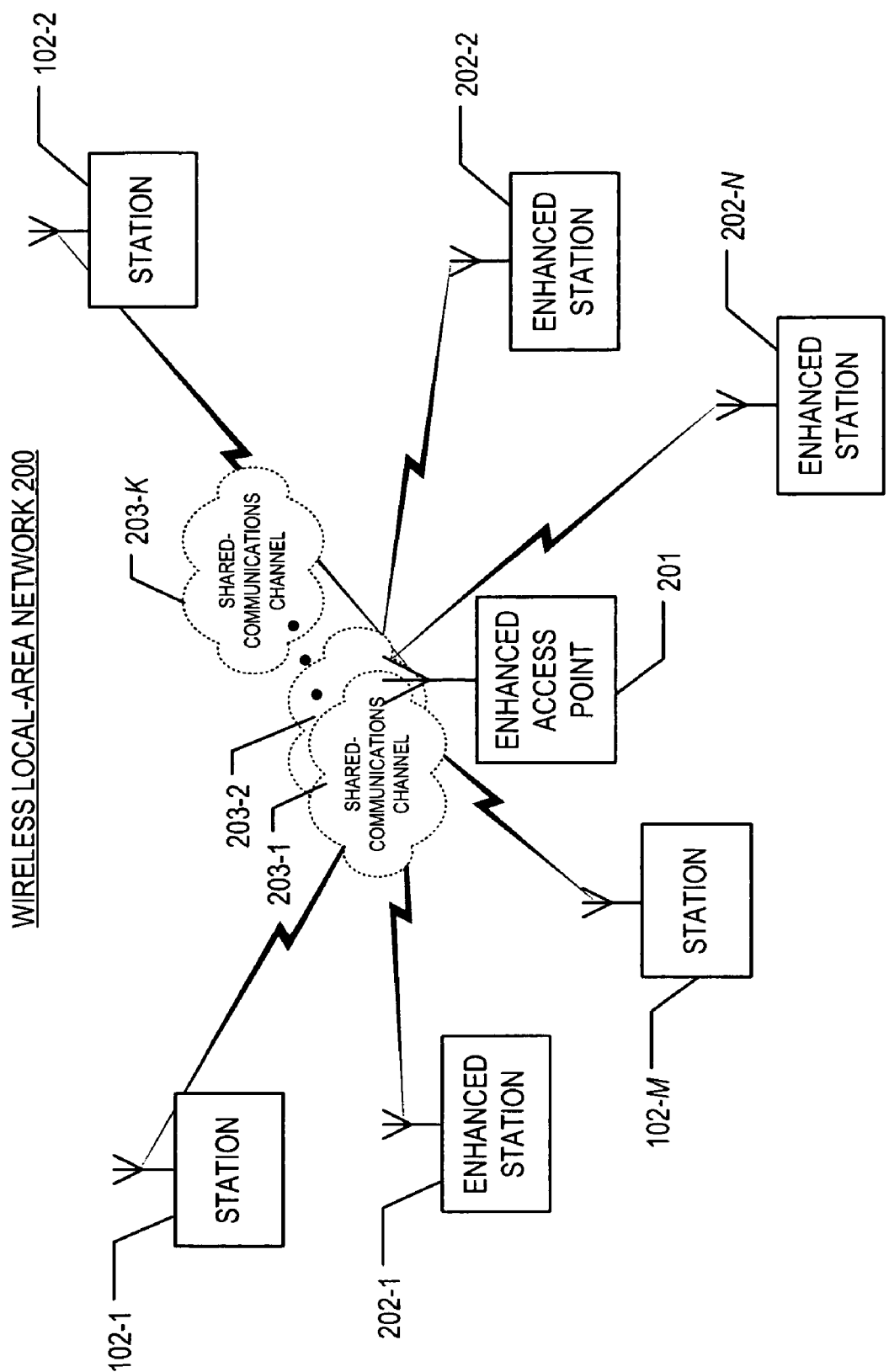
FIG. 2 depicts a schematic diagram of an exemplary wireless local-area network 200 in accordance with the illustrative embodiment of the present invention.

FIG. 2 depicts a schematic diagram of local-area network 200 in accordance with the illustrative embodiment of the present invention. Local-area network 200 comprises legacy stations 102-1 through 102-M, enhanced stations 202-1 through 202-N, wherein N is a positive integer, enhanced access point 201, and shared-communications channels 203-1 through 203-K, wherein K is a positive integer greater than 1, interconnected as shown.

Each enhanced station 202-i, wherein i is a member of the set {1, 2, ... N}, is capable of transmitting and receiving legacy-bandwidth signals over any one of shared-communications channels 203-1 through 203-K. In addition, enhanced station 202-i is capable of transmitting and receiving higher-bandwidth signals over at least one combination of two or more of shared-communications channels 203-1 through 203-K. As described below and with respect to FIGS. 5 through 8, enhanced station 202-i, prior to transmitting either legacy-bandwidth or higher-bandwidth signals, gains access to the appropriate shared-communications channel(s) 203 via an enhanced MAC protocol.

Legacy stations 102-1 through 102-M transmit and receive legacy-bandwidth signals over shared communications channel 203-1, in accordance with the prior art.

Enhanced access point 201, like enhanced stations 202-1 through 202-N, is capable of transmitting and receiving higher-bandwidth signals over at least one combination of two or more of shared-communications channels 203-1 through 203-K, as well as legacy-bandwidth signals over any one of shared-communications channels 203-1 through 203-K. and As described below and with respect to FIGS. 5 through 8, access point 201, like enhanced stations 202-1 through 202-N, employs the enhanced MAC protocol to gain access to the appropriate shared-communications channel(s) for transmitting legacy-bandwidth and higher-bandwidth signals.

As will be appreciated by those skilled in the art, in some embodiments shared-communications channels 203-1 through 203-K might be organized by frequency, time slot, etc.

Figure 3:
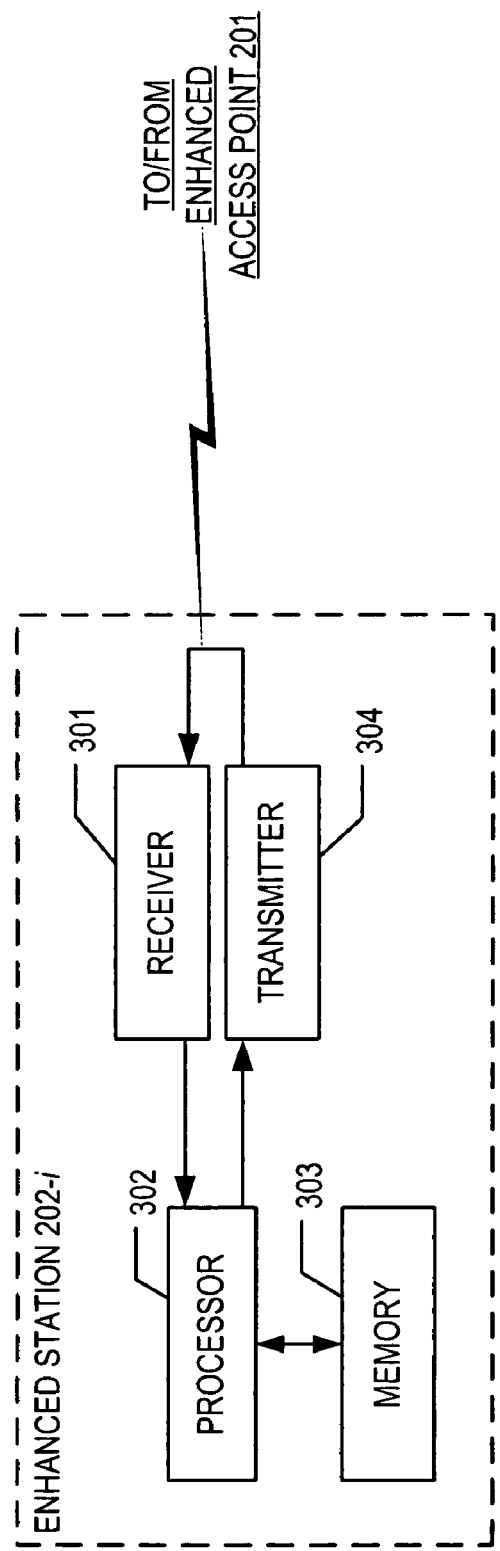
FIG. 3 depicts a block diagram of the salient components of enhanced station 202-i, as shown in FIG. 2, in accordance with the illustrative embodiment of the present invention.

FIG. 3 depicts a block diagram of the salient components of enhanced station 202-i in accordance with the illustrative embodiment of the present invention. Enhanced station 202-i comprises receiver 301, processor 302, memory 303, and transmitter 304, interconnected as shown.

Receiver 301 is a circuit that is capable of receiving, in well-known fashion, (i) legacy-bandwidth signals over any one of shared communications channels 203-1 through 203-K, and (ii) higher-bandwidth signals over at least one combination of two or more of shared-communications channels 203-1 through 203-K. In some embodiments, receiver 301 might only be able to receive higher-bandwidth signals over a combination of two channels, while in some other embodiments, receiver 301 might be able to receive higher-bandwidth signals over a greater number of channels. Similarly, in some embodiments receiver 301 might be able to receive higher-bandwidth signals over a combination of L or fewer channels, where $L \leq K$, while in some other embodiments, receiver 301 might only be able to receive higher-bandwidth signals over a combination of exactly L channels. Furthermore, in some embodiments receiver 301 might only be able to receive signals over a particular fixed combination of channels, while in some other embodiments receiver 301 might be adaptive (e.g., tunable to different frequencies, etc.). As will be appreciated by those skilled in the art, in some embodiments receiver 301 might only be able to receive higher-bandwidth signals over contiguous channel combinations (e.g., contiguous frequencies, contiguous time slots, etc.), while in some other embodiments receiver 301 might be able to receive higher-bandwidth signals over both contiguous and non-contiguous channel combinations. It will be clear to those skilled in the art how to make and use receiver 301.

Processor 302 is a general-purpose processor that is capable of executing instructions stored in memory 303, of reading data from and writing data into memory 303, and of executing the tasks described below and with respect to FIGS. 5 through 7. In some alternative embodiments of the present invention, processor 302 might be a special-purpose processor (e.g., a network processor, etc.). In either case, it will be clear to those skilled in the art, after reading this disclosure, how to make and use processor 302.

Memory 303 is capable of storing programs and data used by processor 302, as is well-known in the art, and might be any combination of random-access memory (RAM), flash memory, disk drive, etc. It will be clear to those skilled in the art, after reading this specification, how to make and use memory 303.

Transmitter 304 is a circuit that is capable of transmitting, in well-known fashion, (i) legacy-bandwidth signals over any one of shared communications channels 203-1 through 203-K, and (ii) higher-bandwidth signals over at least one combination of two or more of shared-communications channels 203-1 through 203-K. In some embodiments, transmitter 304 might only be able to transmit higher-bandwidth signals over a combination of two channels, while in some other embodiments, transmitter 304 might be able to transmit higher-bandwidth signals over a greater number of channels. Similarly, in some embodiments transmitter 304 might be able to transmit higher-bandwidth signals over a combination of L or fewer channels, where $L \leq K$, while in some other embodiments, transmitter 304 might only be able to transmit higher-bandwidth signals over a combination of exactly L channels. Furthermore, in some embodiments transmitter 304 might only be able to transmit signals over a particular fixed combination of channels, while in some other embodiments transmitter 304 might be adaptive (e.g., tunable to different frequencies, etc.). As will be appreciated by those skilled in the art, in some embodiments transmitter 304 might only be able to transmit higher-bandwidth signals over contiguous channel combinations (e.g., contiguous frequencies, contiguous time slots, etc.), while in some other embodiments transmitter 304 might be able to transmit higher-bandwidth signals over both contiguous and non-contiguous channel combinations. It will be clear to those skilled in the art how to make and use transmitter 304.

Figure 4:
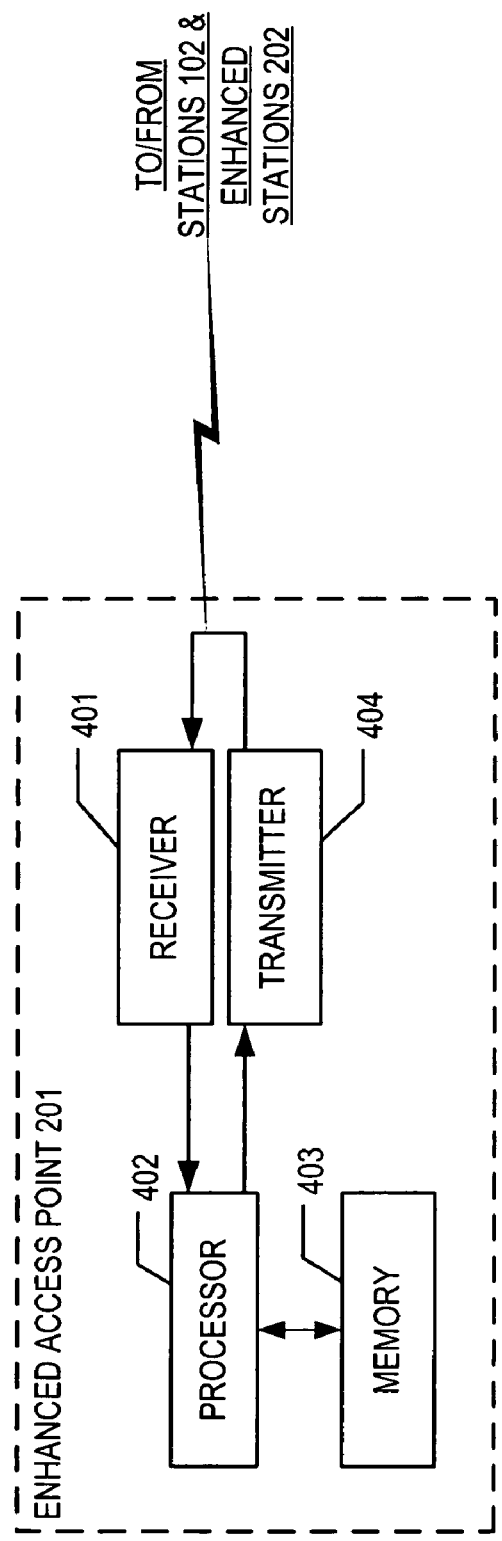
FIG. 4 depicts a block diagram of the salient components of enhanced access point 201, as shown in FIG. 2, in accordance with the illustrative embodiment of the present invention.

FIG. 4 depicts a block diagram of the salient components of enhanced access point 201 in accordance with the illustrative embodiment of the present invention. Enhanced access point 201 comprises receiver 401, processor 402, memory 403, and transmitter 404, interconnected as shown.

Receiver 401 is a circuit that is capable of receiving, in well-known fashion, (i) legacy-bandwidth signals over any one of shared communications channels 203-1 through 203-K, and (ii) higher-bandwidth signals over at least one combination of two or more of shared-communications channels 203-1 through 203-K. In some embodiments, receiver 401 might only be able to receive higher-bandwidth signals over a combination of two channels, while in some other embodiments, receiver 401 might be able to receive higher-bandwidth signals over a greater number of channels. Similarly, in some embodiments receiver 401 might be able to receive higher-bandwidth signals over a combination of L or fewer channels, where $L \leq K$, while in some other embodiments, receiver 401 might only be able to receive higher-bandwidth signals over a combination of exactly L channels. Furthermore, in some embodiments receiver 401 might only be able to receive signals over a particular fixed combination of channels, while in some other embodiments receiver 401 might be adaptive (e.g., tunable to different frequencies, etc.). As will be appreciated by those skilled in the art, in some embodiments receiver 401 might only be able to receive higher-bandwidth signals over contiguous channel combinations (e.g., contiguous frequencies, contiguous time slots, etc.), while in some other embodiments receiver 401 might be able to receive higher-bandwidth signals over both contiguous and non-contiguous channel combinations. It will be clear to those skilled in the art how to make and use receiver 401.

Processor 402 is a general-purpose processor that is capable of executing instructions stored in memory 403, of reading data from and writing data into memory 403, and of executing the tasks described below and with respect to FIGS. 5 through 7. In some alternative embodiments of the present invention, processor 402 might be a special-purpose processor (e.g., a network processor, etc.). In either case, it will be clear to those skilled in the art, after reading this disclosure, how to make and use processor 402.

Memory 403 is capable of storing programs and data used by processor 402, as is well-known in the art, and might be any combination of random-access memory (RAM), flash memory, disk drive, etc. It will be clear to those skilled in the art, after reading this specification, how to make and use memory 403.

Transmitter 404 is a circuit that is capable of transmitting, in well-known fashion, (i) legacy-bandwidth signals over any one of shared communications channels 203-1 through 203-K, and (ii) higher-bandwidth signals over at least one combination of two or more of shared-communications channels 203-1 through 203-K. In some embodiments, transmitter 404 might only be able to transmit higher-bandwidth signals over a combination of two channels, while in some other embodiments, transmitter 404 might be able to transmit higher-bandwidth signals over a greater number of channels. Similarly, in some embodiments transmitter 404 might be able to transmit higher-bandwidth signals over a combination of L or fewer channels, where $L \leq K$, while in some other embodiments, transmitter 404 might only be able to transmit higher-bandwidth signals over a combination of exactly L channels. Furthermore, in some embodiments transmitter 404 might only be able to transmit signals over a particular fixed combination of channels, while in some other embodiments transmitter 404 might be adaptive (e.g., tunable to different frequencies, etc.). As will be appreciated by those skilled in the art, in some embodiments transmitter 404 might only be able to transmit higher-bandwidth signals over contiguous channel combinations (e.g., contiguous frequencies, contiguous time slots, etc.), while in some other embodiments transmitter 404 might be able to transmit higher-bandwidth signals over both contiguous and non-contiguous channel combinations. It will be clear to those skilled in the art how to make and use transmitter 404.

Figure 5:
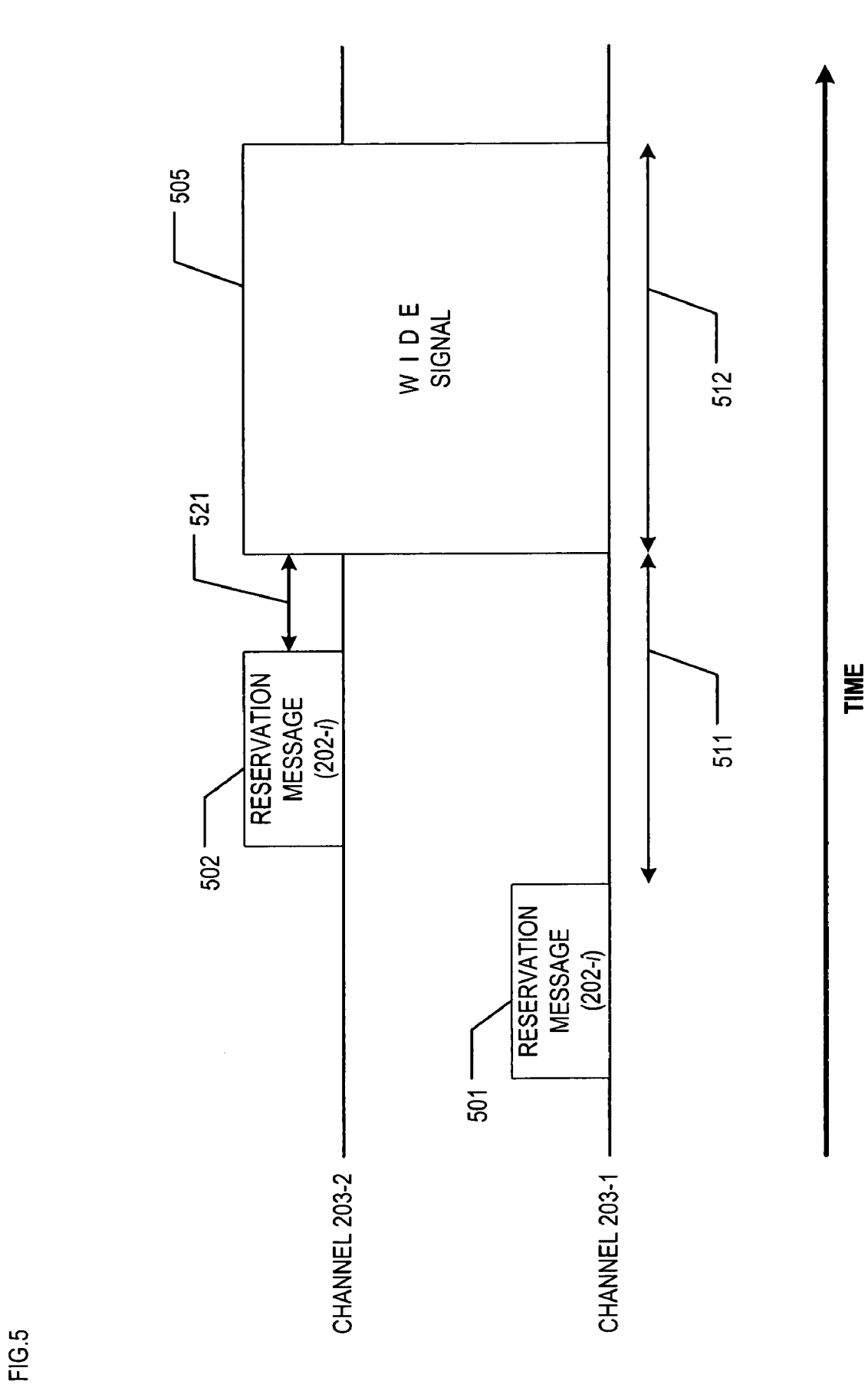
FIG. 5 depicts a first exemplary timing diagram for transmissions of enhanced station 202-i, as shown in FIG. 2, in accordance with the illustrative embodiment of the present invention.

FIG. 5 depicts a first exemplary timing diagram for transmissions of an enhanced station 202-i, in accordance with the enhanced medium access control of the illustrative embodiment. In accordance with the enhanced medium access control, an enhanced station (or enhanced access point 201) that wishes to transmit a wide signal over a plurality of shared-communications channels must first reserve each of the channels. This is accomplished by sequentially transmitting a reservation message over each of the channels.

The reservation message contains a reservation offset that indicates when the reservation of the channel becomes active, and a reservation duration that indicates the duration of the reservation once the reservation becomes active. In the illustrative embodiment, the format of the reservation message is the same as the IEEE 802.11 Request-to-Send (RTS) message, thereby enabling legacy stations to recognize the reservation messages. The following changes are made to an RTS message to create a reservation message:

The address 1 field, which in an RTS message contains the receiver address, is set to the MAC address of the enhanced station or access point that sends the reservation message.

The address 2 field, which in an RTS message contains the transmitter address, is encoded with:

a reservation offset a reservation duration a reservation flag that indicates that the message is a reservation message and not an RTS message a CTS-to-self flag (described below).

The duration field, which in an RTS message contains the Network Allocation Vector (NAV), is set to the sum of the reservation offset and the reservation duration.

Enhanced station 202-i, prior to transmitting a wide signal over the combination of shared-communications channels 203-1 and 203-2, first sends reservation message 501 over channel 203-1. Reservation message 501 comprises reservation offset 511 and reservation duration 512, depicted graphically in FIG. 5.

Legacy stations 102-1 through 102-M receive message 501 over channel 203-1, and, based on the duration field of message 501, which equals the sum of reservation offset 511 and reservation duration 512, refrain from transmitting over channel 203-1 until after the completion of reservation duration 512, in accordance with the legacy medium access control. Enhanced stations 202 (other than 202-i) and access point 201 also receive message 501 over channel 203-1, and, as a result, refrain from transmitting over channel 203-1 during reservation duration 512.

As described below and with respect to FIGS. 6 through 8, enhanced stations 202 (other than 202-i) and access point 201 are permitted to transmit over channel 203-1 during reservation offset 511. In this example, however, enhanced stations 202 other than 202-i and access point 201 have neither legacy-bandwidth nor higher-bandwidth signals queued for transmission, and thus do not attempt to transmit either (i) over channel 203-1 during reservation offset 511, or (ii) over channel 203-2 at all during the salient time period.

As shown in FIG. 5, after transmitting message 501 over shared-communications channel 203-1, enhanced station 202-i transmits reservation message 502 over shared-communications channel 203-2. Reservation message 502 comprises reservation offset 521 and reservation duration 512 (i.e., the same duration as message 501), depicted graphically in FIG. 5.

Enhanced stations 202 other than 202-i and access point 201 receive message 502 and, as a result, refrain from transmitting over channel 203-2 during reservation duration 512. (As described above, in this particular example enhanced stations 202 other than 202-i and access point 201 have no signals to transmit during reservation duration 512 anyway.) Reservation message 502 is not received by legacy stations 102-1 through 102-M since the message is transmitted over channel 203-2.

Enhanced station 202-i then transmits wide signal 505 over the combination of shared-communications channels 203-1 and 203-2 during reservation duration 512, in well-known fashion. In this example, enhanced station 202-i transmits wide signal 505 during the entire reservation duration 512; in accordance with the illustrative embodiment, however, enhanced station 202-i might transmit wide signal 505 only during a portion of reservation duration 512, as described below and with respect to FIG. 8.

As will be clear to those skilled in the art, in accordance with the illustrative embodiment, the exemplary timing diagram of FIG. 5 applies to access point 201 as well as an enhanced station 202-i. In addition, although the example of FIG. 5 (as well as the examples of FIGS. 6 through 8 below) is based on shared-communications channels 203-1 and 203-2, this is merely illustrative, and thus applies to other shared-communications channels as well. It will also be clear to those skilled in the art, after reading this specification, how to extend the enhanced medium access control to handle signals that occupy more than two channels.

Figure 6:
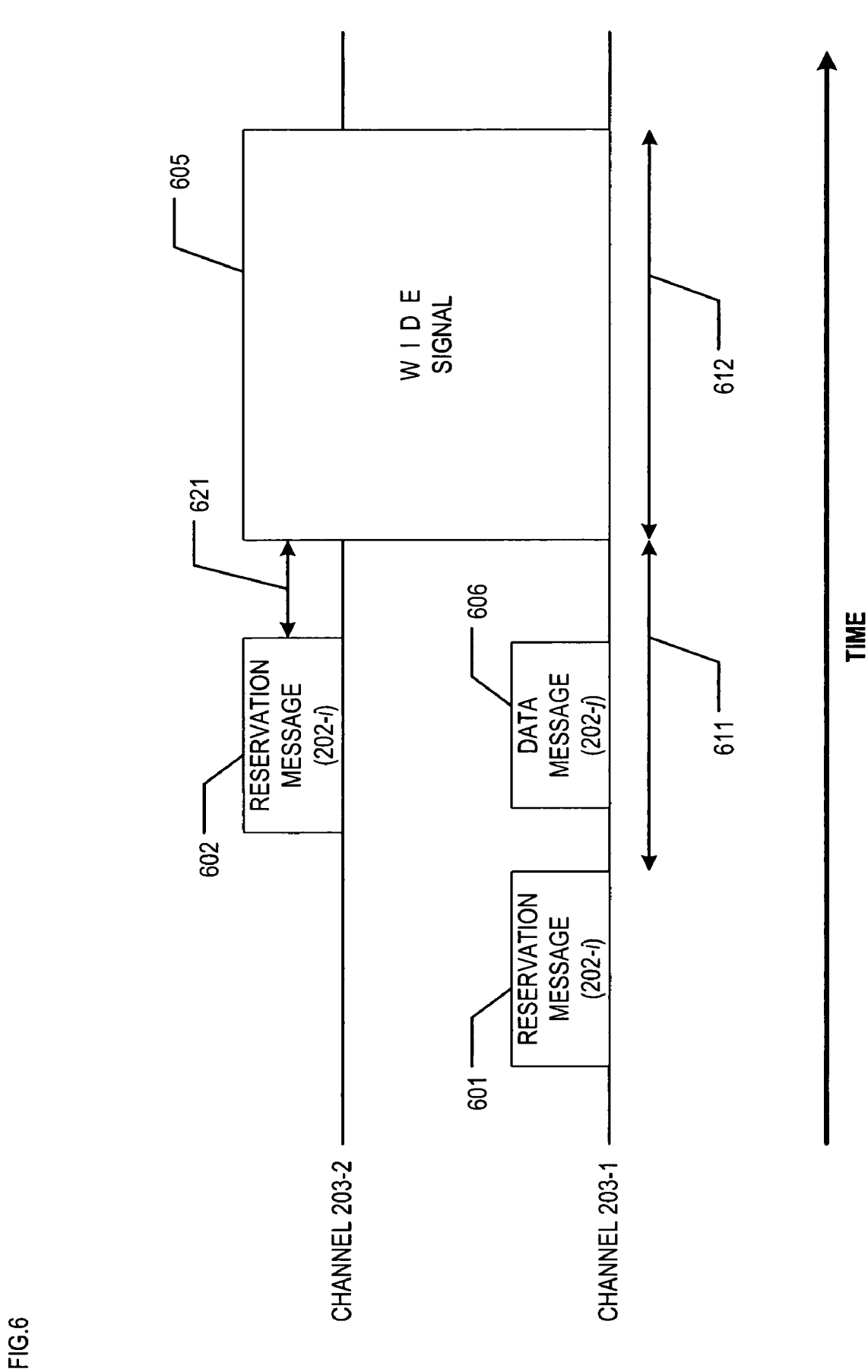
FIG. 6 depicts a second exemplary timing diagram for transmissions of enhanced stations 202-i and 202-j, as shown in FIG. 2, in accordance with the illustrative embodiment of the present invention.

FIG. 6 depicts a second exemplary timing diagram for transmissions of enhanced stations 202-i and 202-j, in accordance with the enhanced medium access control of the illustrative embodiment. Enhanced station 202-i, prior to transmitting a wide signal over the combination of shared-communications channels 203-1 and 203-2, first sends reservation message 601 over channel 203-1. Reservation message 601 comprises reservation offset 611 and reservation duration 612, depicted graphically in FIG. 6.

Legacy stations 102-1 through 102-M receive message 601 over channel 203-1, and, based on the duration field of message 601, which equals the sum of reservation offset 611 and reservation duration 612, refrain from transmitting over channel 203-1 until after the completion of reservation duration 612, in accordance with the legacy medium access control. Enhanced stations 202 other than 202-i (including station 202-j) and access point 201 also receive message 601 over channel 203-1, and, as a result, refrain from transmitting over channel 203-1 during reservation duration 612.

In contrast to the prior example, enhanced station 202-j has legacy-bandwidth data to transmit, and, as a result, contends for access to shared-communications channel 203-1 and, upon gaining access to the channel, transmits data message 606 over the channel during reservation offset 611. Thus, the enhanced medium access control can provide increased throughput by permitting enhanced stations to contend for and transmit legacy-bandwidth data over reserved channels during the reservation offset time interval.

After transmitting message 601 over shared-communications channel 203-1, enhanced station 202-i transmits reservation message 602 over shared-communications channel 203-2. Reservation message 602 comprises reservation offset 621 and reservation duration 612 (i.e., the same duration as in message 601), depicted graphically in FIG. 6.

Enhanced stations 202 other than 202-i and access point 201 receive message 602 and, as a result, refrain from transmitting over channel 203-2 during reservation duration 612. Reservation message 602 is not received by legacy stations 102-1 through 102-M since the message is transmitted over channel 203-2.

Enhanced station 202-i then transmits wide signal 605 over the combination of shared-communications channels 203-1 and 203-2 during reservation duration 612, in well-known fashion.

Figure 7:
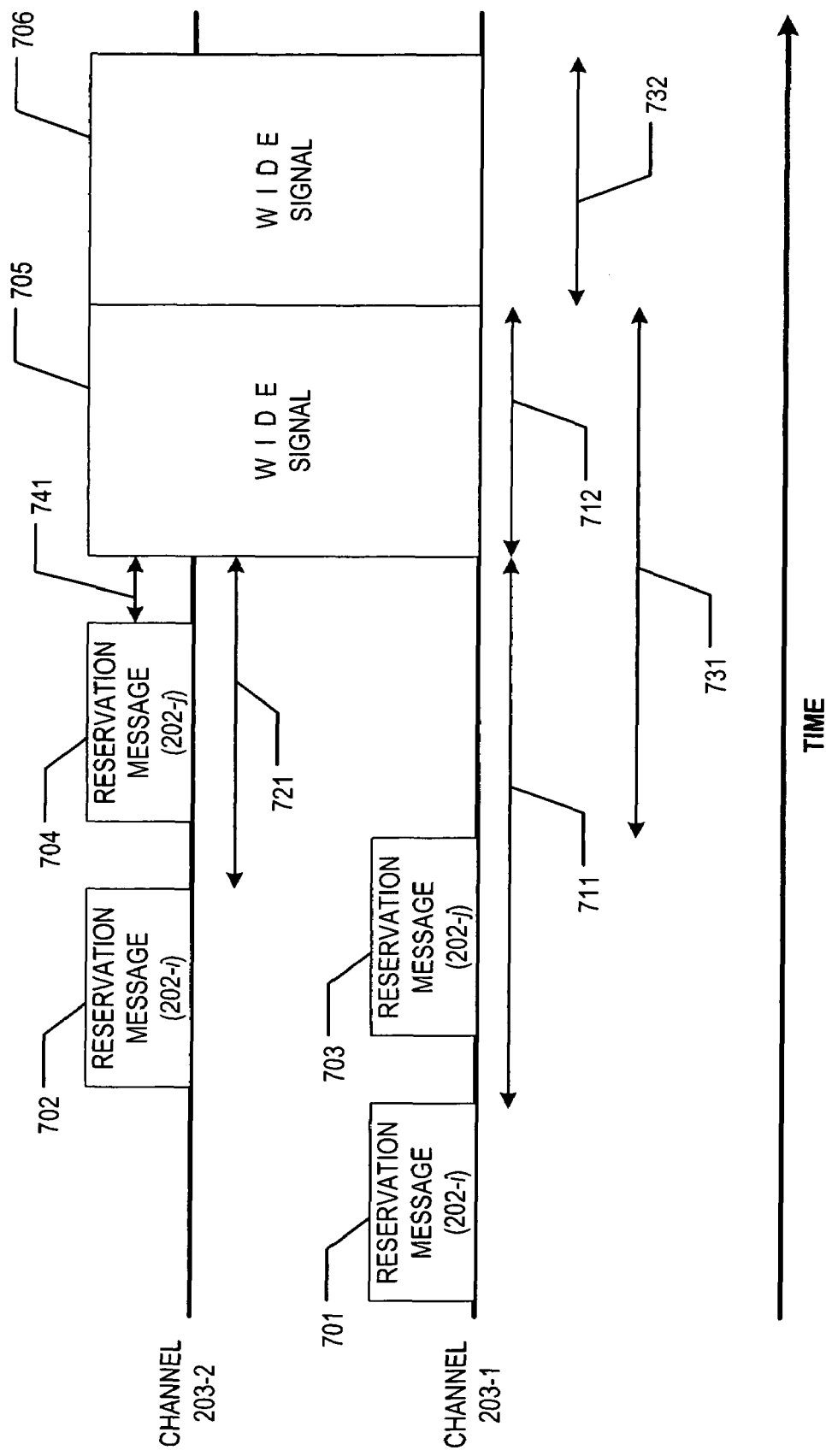
FIG. 7 depicts a third exemplary timing diagram for transmissions of enhanced stations 202-i and 202-j, as shown in FIG. 2, in accordance with the illustrative embodiment of the present invention.

FIG. 7 depicts a third exemplary timing diagram for transmissions of enhanced stations 202-i and 202-j, in accordance with the enhanced medium access control of the illustrative embodiment. As is described below, the example of FIG. 7 illustrates a more aggressive medium access control approach in which enhanced stations other than stations 202-i are permitted to transmit "daisy-chained" reservation messages during the reservation offset of channels that have already been reserved by another enhanced station.

Enhanced station 202-i, prior to transmitting a wide signal over the combination of shared-communications channels 203-1 and 203-2, first sends reservation message 701 over channel 203-1. Reservation message 701 comprises reservation offset 711 and reservation duration 712, depicted graphically in FIG. 7.

Legacy stations 102-1 through 102-M receive message 701 over channel 203-1, and, based on the duration field of message 701, which equals the sum of reservation offset 711 and reservation duration 712, refrain from transmitting over channel 203-1 until after the completion of reservation duration 712, in accordance with the legacy medium access control. Enhanced stations 202 other than 202-i (including station 202-j) and access point 201 also receive message 701 over channel 203-1, and as a result, refrain from transmitting over channel 203-1 during reservation duration 712, as in the example of FIG. 6.

After transmitting message 701 over shared-communications channel 203-1, enhanced station 202-i transmits reservation message 702 over shared-communications channel 203-2. Reservation message 702 comprises reservation offset 721 and reservation duration 712 (i.e., the same duration as in message 701), depicted graphically in FIG. 7.

Enhanced stations 202 other than 202-i (including station 202-j) and access point 201 receive message 702 over channel 203-2, and as a result, refrain from transmitting over channel 203-2 during reservation duration 712. Reservation message 702 is not received by legacy stations 102-1 through 102-M since the message is transmitted over channel 203-2.

While enhanced station 202-i transmits reservation message 702 over shared-communications channel 203-2, enhanced station 202-j, which also wishes to transmit a wide signal over the combination of shared-communications channels 203-1 and 203-2, accordingly transmits reservation message 703 over shared-communications channel 203-1 during reservation offset 711. (As in the example of FIG. 6, enhanced station 202-j must successfully contend for shared-communications channel 203-1 prior to transmitting over the channel.) Reservation message 703 comprises (i)

reservation offset 731, which extends until or beyond the end of reservation duration 712, and (ii) reservation duration 732.

Legacy stations receive message 703 over shared-communications channel 203-1 and, as a result, extend their silent period until the end of reservation duration 732. Enhanced stations other than 202-j (including station 202-i) and enhanced access point 201 also receive reservation message 703 and, as a result, will refrain from transmitting on channel 203-1 during reservation duration 732.

After transmitting reservation message 703 over shared-communications channel 203-1, enhanced station 202-j transmits reservation message 704 over shared-communications channel 203-2, also within the reservation offset 711 time interval. Reservation message 704 comprises (i) reservation offset 741, which, like reservation offset 731, extends until the end of reservation duration 712, and (ii) reservation duration 732 (i.e., the same duration as in message 703). Enhanced stations other than 202-j (including station 202-i) and enhanced access point 201 receive reservation message 704 and, as a result, will refrain from transmitting on channel 203-2 during reservation duration 732.

Enhanced station 202-i then transmits wide signal 705 over the combination of shared-communications channels 203-1 and 203-2 during reservation duration 712, and station 202-j thereafter transmits wide signal 706 over the combination of shared-communications channels 203-1 and 203-2 during reservation duration 732.

Figure 8:
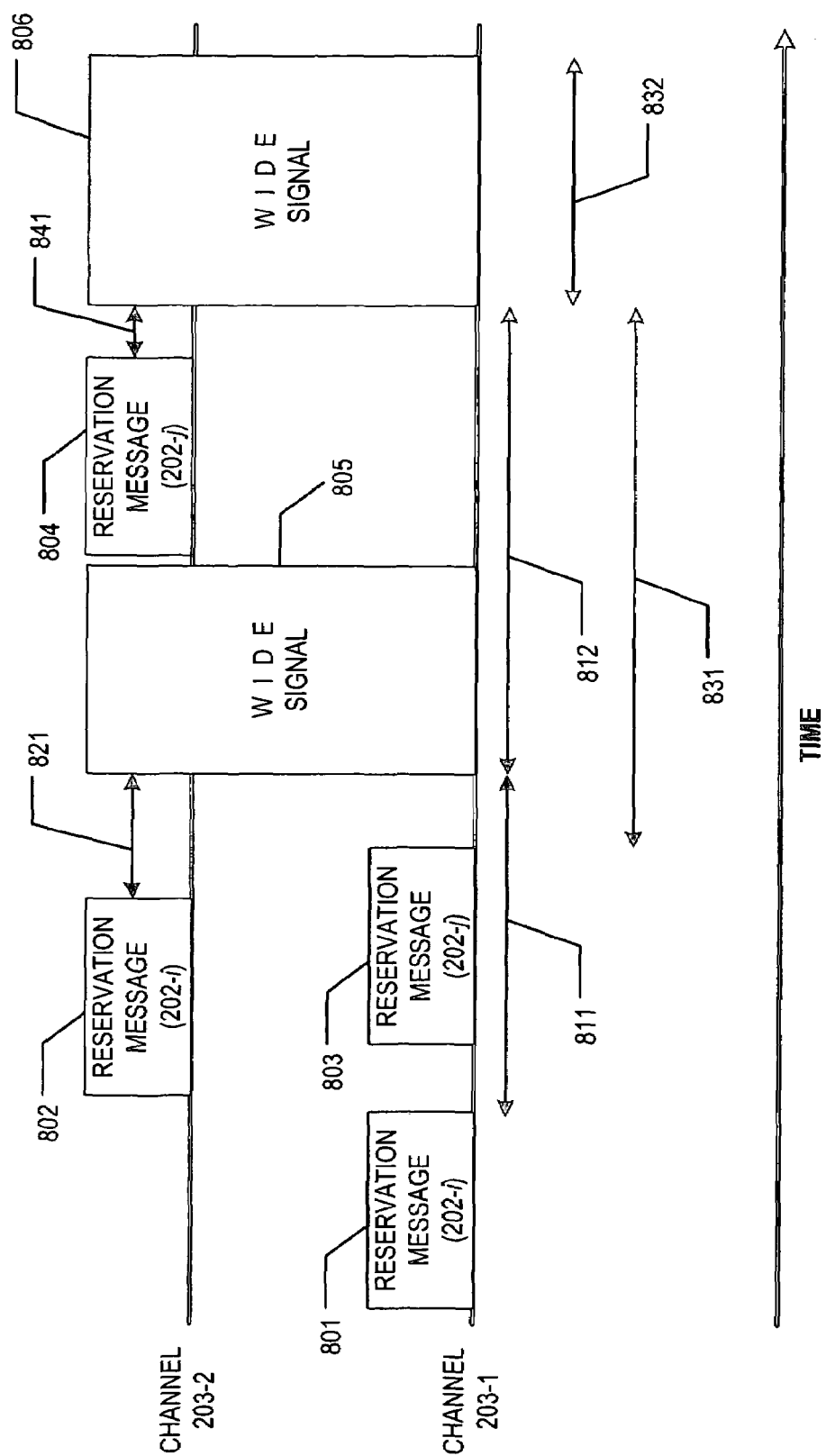
FIG. 8 depicts a fourth exemplary timing diagram for transmissions of enhanced stations 202-i and 202-j, as shown in FIG. 2, in accordance with the illustrative embodiment of the present invention.

FIG. 8 depicts a fourth exemplary timing diagram for transmissions of two enhanced stations 202-i and 202-j, in accordance with the enhanced medium access control of the illustrative embodiment. The example of FIG. 8 illustrates a variation of the reservation "daisy chaining" mechanism disclosed above and with respect to FIG. 7.

Enhanced station 202-i, prior to transmitting a wide signal over the combination of shared-communications channels 203-1 and 203-2, first sends reservation message 801 over channel 203-1. Reservation message 801 comprises reservation offset 811 and reservation duration 812, depicted graphically in FIG. 8.

Legacy stations 102-1 through 102-M receive message 801 over channel 203-1, and, based on the duration field of message 801, which equals the sum of reservation offset 811 and reservation duration 812, refrain from transmitting over channel 203-1 until after the completion of reservation duration 812, in accordance with the legacy medium access control. Enhanced stations 202 other than 202-i (including station 202-j) and access point 201 also receive message 801 over channel 203-1, and as a result, refrain from transmitting over channel 203-1 during reservation duration 812, as in the examples of FIGS. 6 and 8.

After transmitting message 801 over shared-communications channel 203-1, enhanced station 202-i transmits reservation message 802 over shared-communications channel 203-2. Reservation message 802 comprises reservation offset 821 and reservation duration 812 (i.e., the same duration as in message 801), depicted graphically in FIG. 8.

Enhanced stations 202 other than 202-i (including station 202-j) and access point 201 receive message 802 over channel 203-2, and as a result, refrain from transmitting over channel 203-2 during reservation duration 812. Reservation message 802 is not received by legacy stations 102-1 through 102-M since the message is transmitted over channel 203-2.

While enhanced station 202-i transmits reservation message 802 over shared-communications channel 203-2, enhanced station 202-j, which also wishes to transmit a wide signal over the combination of shared-communications channels 203-1 and 203-2, accordingly transmits reservation message 803 over shared-communications channel 203-1 during reservation offset 811. (As above, enhanced station 202-j must successfully contend for shared-communications channel 203-1 prior to transmitting over the channel.) Reservation message 803 comprises (i) reservation offset 831, which extends until or beyond the end of reservation duration 812, and (ii) reservation duration 832.

Legacy stations receive message 803 over shared-communications channel 203-1 and, as a result, extend their silent period until the end of reservation duration 832. Enhanced stations other than 202-j (including station 202-i) and enhanced access point 201 also receive reservation message 803 and, as a result, will refrain from transmitting on channel 203-1 during reservation duration 832.

After transmitting reservation message 803, enhanced station 202-j recognizes, based on reservation offset 821 of received message 802, that there is insufficient time remaining in reservation offset 821 to transmit a reservation message over shared-communications channel 203-2. As a result, enhanced station 202-j will instead monitor enhanced station 202-i's wide-signal transmission during reservation duration 812, as described below.

Enhanced station 202-i transmits wide signal 805 over the combination of shared-communications channels 203-1 and 203-2 during reservation duration 812. In this particular example, enhanced station 202-i completes its transmission before the end of reservation duration 812, as shown in FIG. 8.

Station 202-j, which monitors channels 203-1 and 203-2 during reservation duration 812, detects that the channels are idle and consequently transmits reservation message 804 over channel 203-2. Reservation message 804 comprises (i) reservation offset 841, which, like reservation offset 831, extends until the end of reservation duration 812, and (ii) reservation duration 832 (i.e., the same duration as in message 803).

Enhanced stations other than 202-j (including station 202-i) and enhanced access point 201 receive reservation message 804 and, as a result, will refrain from transmitting on channel 203-2 during reservation duration 832.

Station 202-j then transmits wide signal 806 over the combination of shared-communications channels 203-1 and 203-2 during reservation duration 832, as shown in FIG. 8.

In some embodiments, it might be advantageous for an enhanced station or access point to transmit a Clear-to-Send-to-Self (CTS-to-self) frame after transmitting a reservation message. The purpose of the CTS-to-self frame is to prevent interference from stations that implement an optional Network Allocation Vector (NAV) reset, an operation in legacy medium access controls (e.g., IEEE 802.11 MAC, etc.) that is well-known in the art. As described above, a CTS-to-Self frame has the same format as a reservation message (and thus a Request-to-Send [RTS] frame of the prior art), and is identified by enabling a specified bit in the address2 field.

In addition, in some embodiments it might be advantageous to incorporate negative acknowledgements for reservations as an extra safeguard against collisions between two or more enhanced stations that try to reserve the same channel. In one such embodiment, an enhanced station, when receiving a reservation message over a channel that has already been reserved by another station, transmits a single slot of white noise over the channel in order to deny the reservation. In this scheme, after an enhanced station transmits a reservation message, it listens for the slot period to detect whether the reservation has been denied. Transmitting white noise eliminates any potential problems that might arise when multiple stations simultaneously transmit negative acknowledgements. As will be appreciated by those skilled in the art, in some embodiments a different mechanism might be employed for extra safeguarding against reservation collisions, while in some other embodiments, such a mechanism might be disadvantageous or unnecessary.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. An apparatus comprising:
a receiver for receiving a first message over a first shared-communications channel; and
a processor for: processing the first message, wherein processing said first message comprises:
a notification that said first shared-communications channel has been reserved, and
reserving the first shared-communications channel and a second shared-communications channel, wherein the reserving is defined by one or more values that define in time
(a) a first reservation offset time interval upon the conclusion of which a first signal is transmitted over a combination of the first shared-communications channel and the second shared-communications channel, and during which the first and second shared-communications channels are used; and
(b) a second reservation duration time interval during which a first shared-communications channel and the second shared-communications channel are reserved, and upon the conclusion of which the transmission of the first signal over the combination of said first shared-communications channel and said second shared-communications channel is ended, wherein said second time interval is after said first time interval.

2. The apparatus of claim 1 wherein said first message is also received by a station that always transmits via one shared-communications channel at a time, and wherein said notification causes said station to refrain from transmitting until after said second time interval.

3. The apparatus of claim 1 wherein said receiver is also for receiving, during said first time interval, a second message over said second shared-communications channel associated with reserving said second shared-communications channel.

4. The apparatus of claim 1, further comprising a transmitter for transmitting, during the first reservation offset time interval, a second signal over the first shared-communications channel only.

5. The apparatus of claim 4 wherein said transmitter is also for transmitting, after said second time interval, a third signal over the combination of a plurality of shared-communications channels.

6. The apparatus of claim 5 wherein said transmitter is also for, prior to transmitting said third signal, transmitting sequentially over each of said plurality of shared-communications channels a respective message for reserving each of the plurality of shared-communications channels.

7. The apparatus of claim 4 wherein said transmitter is also for, prior to receiving said first message:
transmitting over each of a plurality of shared-communications channels a respective message for reserving each of the plurality of shared-communications channels; and
transmitting a third signal over the combination of said plurality of shared-communications channels.

8. The apparatus of claim 4 further comprising a processor for:
sending signals to said transmitter, receiving signals from said receiver, and
executing a contention-based protocol prior to said transmitter transmitting said second signal over said first shared-communications channel.

9. The apparatus of claim 4 wherein said second signal comprises a data message.

10. The apparatus of claim 4 wherein said second signal comprises a reservation message for reserving said first shared-communications channel during a third time interval; and wherein said third time interval is after said second time interval; and wherein said transmitter is also for:
transmitting, within said first time interval, a third signal over said second shared-communications channel for reserving said second shared-communications channel during said third time interval, and
transmitting, within said third time interval, a fourth signal over the combination of said first shared-communications channel and said second shared-communications channel.

11. The apparatus of claim 10 wherein said reservation message is also received by a station that always transmits via one shared-communications channel at a time, and wherein said reservation message causes said station to refrain from transmitting until after said third time interval.

12. The apparatus of claim 4 wherein said second signal comprises a reservation message comprising one or more values defining a third time interval; and wherein said third time interval is after said second time interval; and wherein said transmitter is also for:
transmitting, within said second time interval and after said first signal is transmitted, a third signal over said second shared-communications channel for reserving said second shared-communications channel during said third time interval, and
transmitting, within said third time interval, a fourth signal over the combination of said first shared-communications channel and said second shared-communications channel.

13. The apparatus of claim 12 wherein said reservation message is also received by a station that always transmits via one shared-communications channel at a time, and wherein said reservation message causes said station to refrain from transmitting until after said third time interval.

14. A method comprising:
(a) receiving a first message over a first shared-communications channel, wherein said first message comprises:
(i) a notification that said first shared-communications channel has been reserved,
(ii) values that define in time a first reservation offset time interval and a second reservation duration time interval, and
(b) reserving the first shared-communications channel and a second shared-communications channel defined in time by
(i) the first time interval, upon the conclusion of which a first signal is transmitted over a combination of the first shared-communications channel and the second shared-communications channel, and during which the first and second shared-communications channels are used; and (ii) the second time interval upon the conclusion of which the transmission of the first signal over the combination of said first shared-communications channel and said second shared-communications channel is ended, wherein said second time interval is after said first time interval.

15. The method of claim 14 wherein said first message is also received by a station that always transmits via one shared-communications channel at a time, and wherein said notification causes said station to refrain from transmitting until after said second time interval.

16. The method of claim 14 further comprising:
(c) receiving, during said first time interval, a second message over said second shared-communications channel associated with reserving said second shared-communications channel.

17. The method of claim 14 further comprising:
(c) executing, after (a) and prior to (b), a contention-based protocol to gain access to said first shared-communications channel.

18. The method of claim 14, further comprising transmitting, within said time interval, a second signal over said first shared-communications channel only.

19. The method of claim 18 further comprising:
(c) transmitting, after said second time interval, sequentially over each of a plurality of shared-communications channels a respective message for reserving each of the plurality of shared-communications channels; and
(d) transmitting a third signal over the combination of said plurality of shared-communications channels.

20. The method of claim 18 further comprising:
transmitting, prior to receiving said first message, sequentially over each of a plurality of shared-communications channels a respective message for reserving each of the plurality of shared-communications channels; and transmitting a third signal over the combination of said plurality of shared-communications channels.

21. The method of claim 18 wherein said second signal comprises a reservation message for reserving said first shared-communications channel during a third time interval that is after said second time interval; said method further comprising:
(c) transmitting, within said first time interval, a third signal over said second shared-communications channel for reserving said second shared-communications channel during said third time interval, and
(d) transmitting, within said third time interval, a fourth signal over the combination of said first shared-communications channel and said second shared-communications channel.

22. The method of claim 18 wherein said second signal comprises a reservation message for reserving said first shared-communications channel during a third time interval that is after said second time interval; said method further comprising:
(c) transmitting, within said second time interval and after said first signal is transmitted, a third signal over said second shared-communications channel for reserving said second shared-communications channel during said third time interval, and
(d) transmitting, within said third time interval, a fourth signal over the combination of said first shared-communications channel and said second shared-communications channel.

* * * * *